Major B. Marshall.
75438 — Animal Trap.

PATENTED
MAR 10 1868

Witnesses:
Solon C. Kemon
Chas. A. Pettis

Inventor:
Major B. Marshall
By Munn & Co.
Attorneys

United States Patent Office.

MAJOR B. MARSHALL, OF DRAW BRIDGE, MARYLAND.

Letters Patent No. 75,438, dated March 10, 1868.

IMPROVED ANIMAL-TRAP.

*The Schedule referred to in these Letters Patent and making part of the same.*

TO ALL WHOM IT MAY CONCERN:

Be it known that I, MAJOR B. MARSHALL, of Draw Bridge, in the county of Dorchester, and State of Maryland, have invented a new and useful Improvement in Animal-Traps; and I do hereby declare that the following is a full, clear, and exact description of the construction and operation of the same, reference being had to the annexed drawings, making a part of this specification, in which—

This improved trap is designed particularly to catch animals that travel in paths or leads, and the invention consists in so constructing it that it can be more easily sprung, and will more effectually secure the animal, than will the traps hitherto in use.

Figure 1:
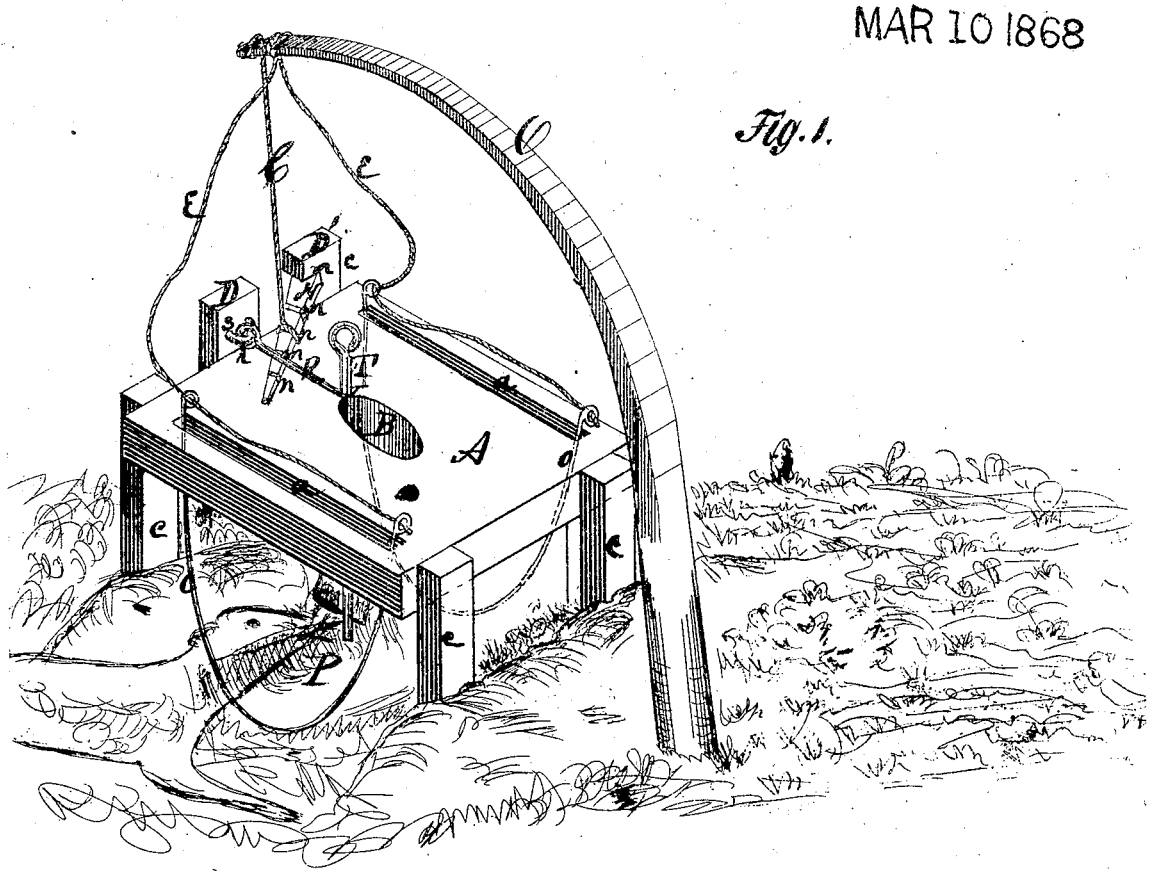
Figure 1 is a perspective view.
Figure 2:
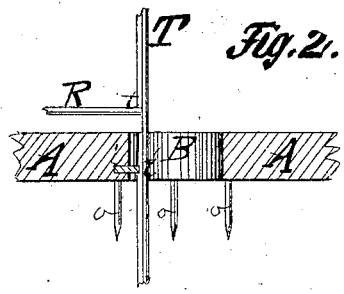
Figure 2 is a longitudinal vertical section through a portion of the trap.

In the drawings, A represents a small table of plank, having side slots $a\ a$, and a central aperture, B, and supported upon form legs, $c\ c\ c\ c$. This table is placed over the path, P, which the animal is accustomed to traverse, in such a manner that the slots $a\ a$ extend across above the path, and the aperture B comes vertically over it. Standards D D' are provided at one end of the table A, one of them having a notch, $m$, in its inner edge, and the other having a staple, $s$, to which is fastened a rod, R, by means of an eye, $r$, on one end of it. In connection with the rod R an upright rod, T, provided with two shoulders or notches, $t\ t'$, is employed in a manner, shown clearly in fig. 2, for setting or springing the trap. The rod T being placed in an upright position in the aperture B, one notch, $t'$, engaging under the lower edge of the wall of the aperture, or under a catch or ledge, $i$, provided for the purpose, and the other notch, $t$, coming just above the surface of the table, the free end of the rod R is caught or set under the notch $t$, in order to set the trap. A short wooden bar, N, connected by a cord, C, to a spring-pole, O, is then drawn down so as to spring the pole, as shown in fig. 1, and one end of it is placed under the notch $n$, the other being slipped under the rod R. The upward spring of the pole O will then cause the parts to remain in position until by some means either the rod T, rod R, or bar N, is thrown out of place. The rod T extends down towards the lead or path P, where the bait may be attached to it. The animal coming along the path will, either by nibbling the bait, or by striking against the lower end of the rod T, disengage the latter from the wall of the aperture B, or disengage the rod R from it, and thus leave the pole O free to spring back and draw up the chokers $o\ o$, which are attached to it by loose cords $e\ e$. One of the chokers operates in each of the slots $a\ a$ extending across the path, so that on whichever side of the trap the animal approaches he is sure to be caught. The bar N is provided with several notches, $n\ n\ n\ n$, in any of which the cord C may be adjusted, whereby the force with which the bar acts upward against the rod R may be graduated at pleasure, and the trap be made to spring with equal ease whether a very stout and inflexible spring-pole, or a very limber and weak one, be used. The under side of the table A may be provided with sharp spikes, $v\ v\ v$, which will pierce the animal when caught, and render his escape impossible.

Having thus described my invention, what I claim as new, and desire to secure by Letters Patent, is—

1. In an animal-trap, I claim a table, A, having two slots $a\ a$ and a central aperture, B, and provided with legs $c\ c\ c\ c$, and standards D D', substantially as and for the purpose specified.

2. I claim the combination of the spring-pole O, cords C, $e\ e$, bar N, rods R and T, and chokers $o\ o$, substantially as and for the purpose set forth.

3. I claim the notched and graduated bar N, when used in a trap of this description, substantially as and for the purpose set forth.

To the above specification of my improvement, I have signed my hand, this thirty-first day of January, 1868.

MAJOR B. MARSHALL.

Witnesses:
CHAS. A. PETTIT,
CHAS. F. MYERS.